(12) United States Patent
Yang et al.

(10) Patent No.: US 12,009,703 B2
(45) Date of Patent: Jun. 11, 2024

(54) ROTOR-COOLING STRUCTURE OF A DRIVE MOTOR

(71) Applicants: HYUNDAI MOTOR COMPANY, Seoul (KR); KIA CORPORATION, Seoul (KR)

(72) Inventors: Hong Seok Yang, Suwon-si (KR); Tae Ho Kim, Hwaseong-si (KR); Jae Won Ha, Hwaseong-si (KR); Jae Young Choi, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 88 days.

(21) Appl. No.: 17/516,388

(22) Filed: Nov. 1, 2021

(65) Prior Publication Data
US 2022/0294295 A1   Sep. 15, 2022

(30) Foreign Application Priority Data
Mar. 10, 2021   (KR) .......................... 10-2021-0031165

(51) Int. Cl.
*H02K 1/32*   (2006.01)
*H02K 5/20*   (2006.01)
*H02K 9/19*   (2006.01)

(52) U.S. Cl.
CPC ............... *H02K 1/32* (2013.01); *H02K 5/203* (2021.01); *H02K 9/19* (2013.01)

(58) Field of Classification Search
CPC . H02K 1/32; H02K 5/203; H02K 9/19; Y02T 10/64
USPC ............................................................ 310/54
See application file for complete search history.

(56) References Cited

U.S. PATENT DOCUMENTS

| 5,889,342 | A  | * | 3/1999  | Hasebe   | H02K 9/19 310/156.19 |
| 8,492,941 | B2 | * | 7/2013  | Endo     | H02K 1/32 310/59 |
| 8,896,167 | B2 | * | 11/2014 | McKinzie | H02K 9/00 310/60 A |
| 8,970,074 | B2 | * | 3/2015  | Wagner   | H02K 7/003 310/59 |
| 9,627,943 | B2 | * | 4/2017  | Tokunaga | H02K 9/19 |
| 9,806,572 | B2 | * | 10/2017 | Yamagishi | H02K 9/19 |
| 9,847,682 | B2 | * | 12/2017 | Takahashi | H02K 1/28 |

(Continued)

FOREIGN PATENT DOCUMENTS

| CN | 106100186 B | * | 1/2019 | ............ H02K 1/32 |
| JP | 2006333660 A |   | 12/2006 |   |

*Primary Examiner* — Alex W Mok
(74) *Attorney, Agent, or Firm* — Lempia Summerfield Katz LLC

(57) ABSTRACT

A rotor-cooling structure is for a drive motor including an inner shaft, a rotor shaft surrounding the inner shaft, a rotor connected to the rotor shaft, and a stator disposed to be spaced apart from the rotor. The rotor-cooling structure includes: a first flow passage formed in the inner shaft; a second flow passage formed in the rotor shaft to receive oil through the first flow passage; a third flow passage formed in a plate disposed at an end of a rotor core, constituting the rotor, to be connected to the second flow passage; and a fourth flow passage formed to be connected to the third flow passage and to penetrate the rotor core in the direction in which core plates constituting the rotor core are stacked.

13 Claims, 5 Drawing Sheets

(56) References Cited

U.S. PATENT DOCUMENTS

| | | | |
|---|---|---|---|
| 10,027,195 B2* | 7/2018 | Jeong | H02K 9/19 |
| 10,199,893 B2* | 2/2019 | Okochi | H02K 1/32 |
| 2014/0077631 A1* | 3/2014 | Watanabe | H02K 9/19 |
| | | | 310/54 |
| 2016/0322874 A1* | 11/2016 | Yoshinori | H02K 1/32 |
| 2017/0133912 A1* | 5/2017 | Gi | H02K 7/003 |
| 2018/0375395 A1* | 12/2018 | Yamagishi | H02K 9/197 |
| 2019/0173352 A1* | 6/2019 | Yamaguchi | H02K 9/19 |
| 2019/0319505 A1* | 10/2019 | Degner | H02K 7/003 |
| 2020/0244123 A1* | 7/2020 | Kang | H02K 1/32 |
| 2020/0343791 A1* | 10/2020 | Kitagawa | H02K 7/083 |

\* cited by examiner

ROTOR-COOLING STRUCTURE OF A DRIVE MOTOR

CROSS-REFERENCE TO RELATED APPLICATION

This application claims under 35 U.S.C. § 119(a) the benefit of priority to Korean Patent Application No. 10-2021-0031165 filed on Mar. 10, 2021, the entire contents of which are incorporated herein by reference.

BACKGROUND

(a) Technical Field

The present disclosure relates to a rotor-cooling structure of a drive motor, the rotor cooling structure including a plurality of flow passages to cool a rotor of a drive motor.

(b) Background Art

An electric vehicle (EV) or a hybrid electric vehicle (HEV) is driven using driving force generated by a drive motor. The drive motor includes a stator, around which a coil is wound, and a rotor, which is rotatably mounted. Here, the rotor is composed of a rotor core, which is disposed inside the stator, and a shaft, which passes through the rotor core.

Recently, there has been ongoing demand for smaller drive motors exhibiting increased power output and operational efficiency. Therefore, research is needed to enable drive motors to operate more stably by improving the cooling performance thereof. In other words, because heat decreases the efficiency of a drive motor, the efficiency of the drive motor depends on the cooling structure of the drive motor. Therefore, a drive motor requires a structure for appropriately removing the heat generated therefrom to operate stably. In particular, the heat generated from the drive motor may cause demagnetization of a permanent magnet.

In general, a drive motor is structured such that cooling oil is sprayed on to a rotor. To this end, a separate flow passage through which the oil flows and a nozzle for spraying the oil are formed at a housing of the drive motor. However, because the above and other components for cooling the rotor are coupled to the housing, the cost of manufacturing the drive motor increases. Further, because the sprayed oil cools only the stator and the outer side of the rotor, it is difficult to remove the heat generated from the inner side of the rotor.

The above information disclosed in this Background section is only to enhance understanding of the background of the disclosure. Therefore, the Background section may contain information that does not form the related art that is already known in this country to a person of ordinary skill in the art.

SUMMARY OF THE DISCLOSURE

The present disclosure has been made in an effort to solve the above-described problems associated with the related art. It is an object of the present disclosure to provide a rotor-cooling structure of a drive motor in which a plurality of flow passages is formed in order to cool a rotor of a drive motor.

In one aspect, the present disclosure provides a rotor-cooling structure of a drive motor including an inner shaft, a rotor shaft surrounding the inner shaft, a rotor connected to the rotor shaft, and a stator disposed to be spaced apart from the rotor. The rotor-cooling structure includes: a first flow passage formed in the inner shaft; a second flow passage formed in the rotor shaft to receive oil through the first flow passage; a third flow passage formed in a plate disposed at an end of a rotor core, constituting the rotor, to be connected to the second flow passage; and a fourth flow passage formed to be connected to the third flow passage and to penetrate the rotor core in the direction in which core plates constituting the rotor core are stacked.

In an embodiment, the first flow passage may be formed in the axial direction of the inner shaft.

In another embodiment, the second flow passage may be formed to penetrate the rotor shaft in a direction moving away from the inner shaft.

In still another embodiment, the inner shaft may have a discharge hole formed therein to discharge the oil, and the discharge hole may communicate with the second flow passage.

In yet another embodiment, the third flow passage may extend in a direction from the rotor shaft toward the outer circumference of the rotor core. The uppermost portion of the rotor core that is adjacent to the plate may contact the oil flowing through the third flow passage.

In still yet another embodiment, the third flow passage may be inclined in a direction opposite the rotating direction of the rotor at a predetermined angle with respect to a direction from the center of the inner shaft toward the outer circumference of the rotor core.

In a further embodiment, the point at which the second flow passage and the third flow passage meet and the point at which the third flow passage and the fourth flow passage meet may be located in regions corresponding to opposite poles of the rotor.

In another further embodiment, the plate may include a first plate, located at one end of the rotor core, and a second plate, located at the opposite end of the rotor core. The third flow passage may be formed in the first plate.

In still another further embodiment, the oil introduced into the third flow passage may flow through the fourth flow passage and may be discharged through a plate hole formed in the second plate.

In yet another further embodiment, the point at which the third flow passage and the fourth flow passage meet may correspond to one end of the fourth flow passage. The point at which the plate hole and the fourth flow passage meet may correspond to the opposite end of the fourth flow passage.

In still yet another further embodiment, the fourth flow passage may be formed in a space between the rotor shaft and a pair of permanent magnets constituting one of poles of the rotor.

In a still further embodiment, the fourth flow passage may be formed to be curved toward the outer circumference of the rotor core.

In a yet still further embodiment, the third flow passage and the fourth flow passage may be provided in a plurality thereof. At least one of the plurality of third flow passages and at least one of the plurality of fourth flow passages may be formed in each of regions corresponding to the poles of the rotor.

In a yet still further embodiment, the rotor-cooling structure may further include a fifth flow passage formed in the rotor shaft to discharge the oil passing through the first flow passage. The oil discharged from the fifth flow passage may be moved toward the stator by rotation of the rotor.

In a yet still further embodiment, the rotor-cooling structure may further include an oil pump provided in a housing accommodating the rotor and the stator to supply the oil to the inner shaft. The oil supplied by the oil pump may cool the rotor while flowing through the first flow passage, the second flow passage, the third flow passage, and the fourth flow passage.

The above and other aspects, features, and embodiments of the disclosure are discussed below.

BRIEF DESCRIPTION OF THE DRAWINGS

The above and other features of the present disclosure are now described in detail with reference to certain embodiments thereof, illustrated in the accompanying drawings, which are given hereinbelow by way of illustration only, and thus are not limitative of the present disclosure, and wherein.

Figure 1:
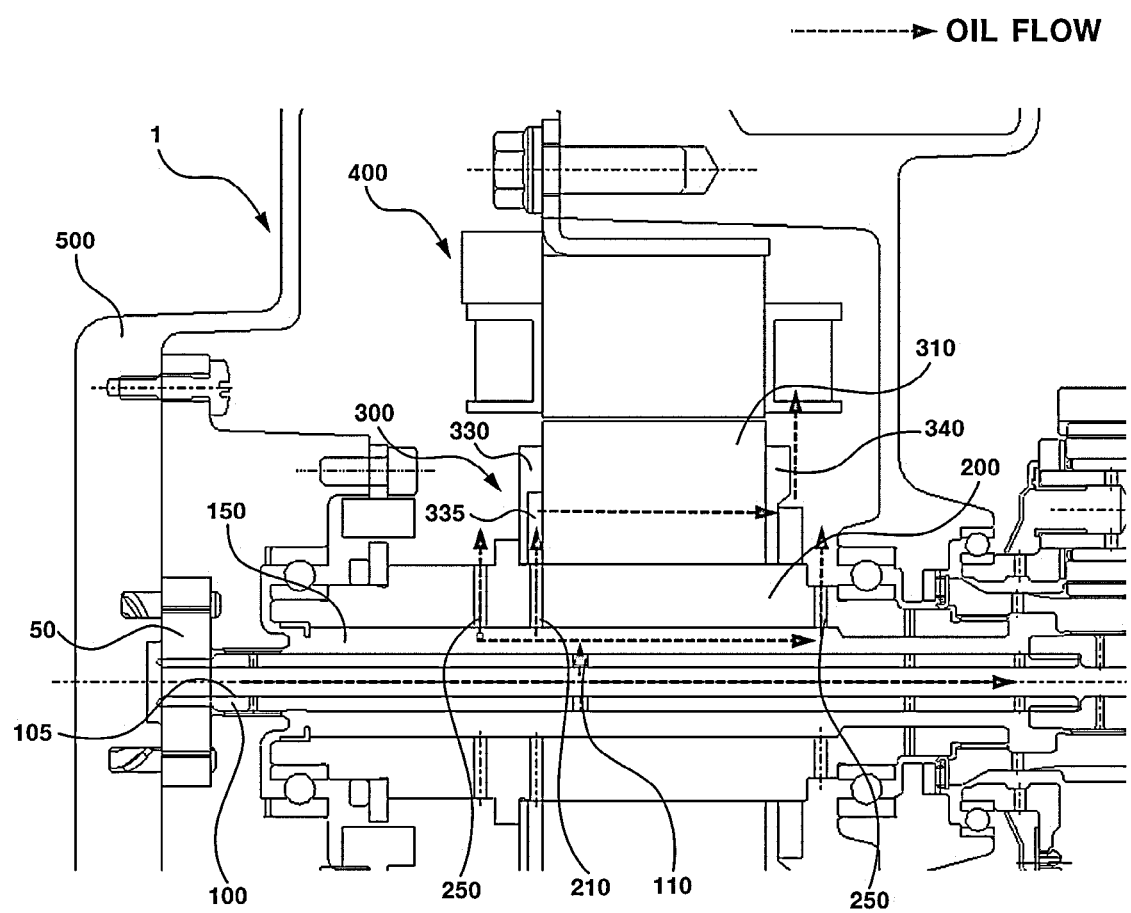
FIG. 1 is a view showing a rotor-cooling structure of a drive motor according to an embodiment of the present disclosure.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Advantages and features of the present disclosure and methods for achieving them should be made clear from embodiments described below in detail with reference to the accompanying drawings. The present disclosure may, however, be embodied in many different forms, and should not be construed as being limited to the embodiments set forth herein. Rather, these embodiments are provided so that this disclosure is thorough and complete, and fully conveys the scope of the disclosure to those having ordinary skill in the art. The present disclosure is defined only by the scope of the claims. Throughout the specification, the same reference numerals represent the same components.

Additionally, terms such as "first", "second", etc. may be used herein to describe the components of the embodiments. These terms are only used to distinguish one element from another element, and the essence, order, or sequence of corresponding elements is not limited by these terms.

The detailed description is illustrative of the present disclosure. Also, the disclosure is intended to illustrate and explain embodiments of the present inventive concept, and the present disclosure may be implemented in various other combinations, modifications, and environments. In other words, the present disclosure may be changed or modified within the scope of the inventive concept disclosed herein, within the equivalent scope of the disclosure, and/or within the skill and knowledge of the art. The described embodiments illustrate several state of the art implementations of the technical idea of the present disclosure. Various changes may be made thereto as demanded for specific applications and uses of the present inventive concept. Accordingly, the detailed description is not intended to limit the present disclosure to the embodiments. Also, the appended claims should be construed as encompassing such other embodiments.

When a component, device, element, or the like of the present disclosure is described as having a purpose or performing an operation, function, or the like, the component, device, or element should be considered herein as being "configured to" meet that purpose or to perform that operation or function.

FIG. 1 is a view showing a rotor-cooling structure of a drive motor according to an embodiment of the present disclosure.

Referring to FIG. 1, a drive motor 1, which is applied to environment-friendly vehicles, may include an inner shaft 100, a rotor shaft 200 surrounding the inner shaft 100, a rotor 300 connected to the rotor shaft 200, a stator 400 disposed to be spaced apart from the rotor 300, and a housing 500 accommodating the rotor 300 and the stator 400. When the drive motor 1 is seen in a cross-sectional view, the inner shaft 100, the rotor shaft 200, the rotor 300, and the stator 400 may be arranged to overlap vertically. A rotor-cooling structure for cooling the rotor 300 may be applied to the drive motor 1. The rotor-cooling structure of the drive motor 1 may include a first flow passage 105, a second flow passage 210, a third flow passage 335, a fourth flow passage (not shown), and a fifth flow passage 250.

The first flow passage 105 may be formed inside the inner shaft 100. The first flow passage 105 may extend in the axial direction of the inner shaft 100. Oil that flows through the first flow passage 105 may be supplied by an oil pump 50. The oil pump 50 may be disposed in the housing 500, which accommodates the rotor 300 and the stator 400, in order to supply oil to the first flow passage 105. The oil in the first flow passage 105 may be discharged to a discharge hole 110 by the rotational force of the inner shaft 100. The discharge hole 110 may be a hole that is exposed from the inner shaft 100 toward the rotor shaft 200. The discharge hole 110 may be provided in a plural number and may be formed in the inner shaft 100. The oil discharged from the discharge hole 110 may be provided to a gap 150 between the inner shaft 100 and the rotor shaft 200. The discharge hole 110 may communicate with the second flow passage 210 through the gap 150.

The second flow passage 210 may be formed in the rotor shaft 200 and may receive oil through the first flow passage 105. The second flow passage 210 may be formed to penetrate the rotor shaft 200 in a direction moving away from the inner shaft 100. In other words, the second flow passage 210 may extend in the radial direction of the rotor 300. The second flow passage 210 may be provided in a plural number. Oil flowing through the gap 150 may be introduced into the second flow passage 210 by the rotational force of the drive motor 1. The second flow passage 210 may extend toward a portion between a rotor core 310, which constitutes the rotor 300, and a first plate 330, which is disposed at an end of the rotor core 310.

The third flow passage 335 may be connected to the second flow passage 210, and may be formed in the first plate 330, which is disposed at the end of the rotor core 310. The third flow passage 335 may extend in a direction from the rotor shaft 200 toward the outer circumference of the rotor core 310. The third flow passage 335 may be provided in a plural number. For example, the number of third flow passages 335 may be the same as the number of second flow passages 210. The uppermost portion of the rotor core 310 that is adjacent to the first plate 330 may contact the oil flowing through the third flow passage 335. In other words, the third flow passage 335 may be formed in the surface of the first plate 330 that faces the rotor core 310.

The fourth flow passage (not shown) may be connected to the third flow passage 335 and may be formed to penetrate the rotor core 310 in the direction in which core plates of the rotor core 310 are stacked. The fourth flow passage (not shown) may be provided in a plural number. For example, the number of fourth flow passages (not shown) may be the same as the number of third flow passages 335. Oil supplied through the third flow passage 335 may flow from the first plate 330 to a second plate 340 through the fourth flow passage (not shown). The second plate 340 may be attached to the other end of the rotor core 310 that is opposite the end of the rotor core 310 at which the first plate 330 is disposed.

The oil passing through the fourth flow passage (not shown) may be discharged through a plate hole (not shown) formed in the second plate 340. The discharged oil may be made to flow toward the stator 400 by the rotational force of the drive motor 1.

The fifth flow passage 250 may be formed in the rotor shaft 200. Similar to the second flow passage 210, the fifth flow passage 250 may be formed to penetrate the rotor shaft 200. However, the fifth flow passage 250 may be formed in order to discharge oil to the outside of the first plate 330 and the second plate 340. The oil discharged through the fifth flow passage 250 may flow toward the stator 400 due to the rotational force of the drive motor 1.

According to an embodiment of the present disclosure, the oil supplied by the oil pump 50 may cool the rotor 300 while flowing through the first flow passage 105, the second flow passage 210, the third flow passage 335, and the fourth flow passage (not shown). In addition, the oil discharged through the fourth flow passage (not shown) and the fifth flow passage 250 may flow toward the stator 400 and may cool the stator 400. It is possible to cool the rotor 300 and the stator 400 of the drive motor 1 by forming flow passages in the existing components without adding a separate component to the drive motor 1.

Figure 2:
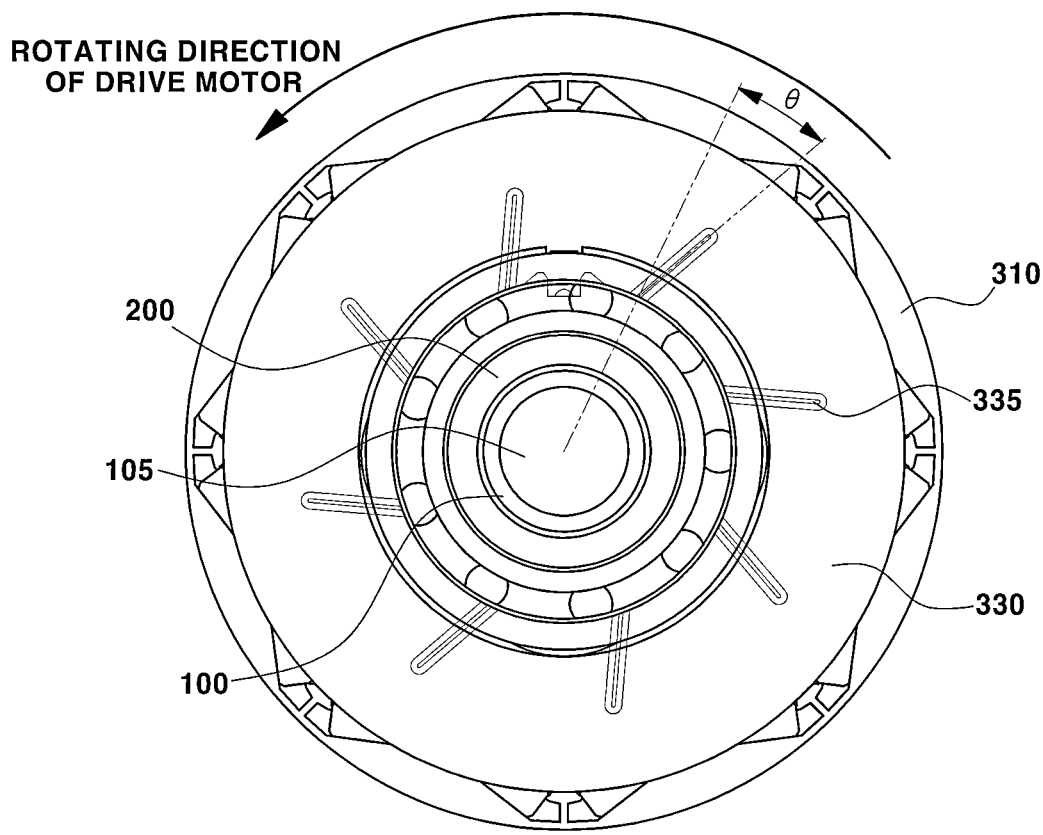
FIG. 2 is a cross-sectional view for explaining a third flow passage according to an embodiment of the present disclosure.

FIG. 2 is a cross-sectional view for explaining the third flow passage according to an embodiment of the present disclosure.

Referring to FIGS. 1 and 2, the third flow passage 335 may be provided in a plural number and may be formed in the surface of the first plate 330. The third flow passage 335 may be formed to be inclined in a direction opposite the rotating direction of the rotor 300 at a predetermined angle θ with respect to the direction from the center of the inner shaft 100 toward the outer circumference of the rotor core 310. For example, the third flow passage 335 may be inclined at an angle ranging from 30 degrees to 45 degrees with respect to the direction from the center of the inner shaft 100 toward the outer circumference of the rotor core 310. Since the third flow passage 335 is inclined in a direction opposite the rotating direction of the rotor 300, the oil may smoothly flow when the drive motor 1 rotates.

Figure 3:
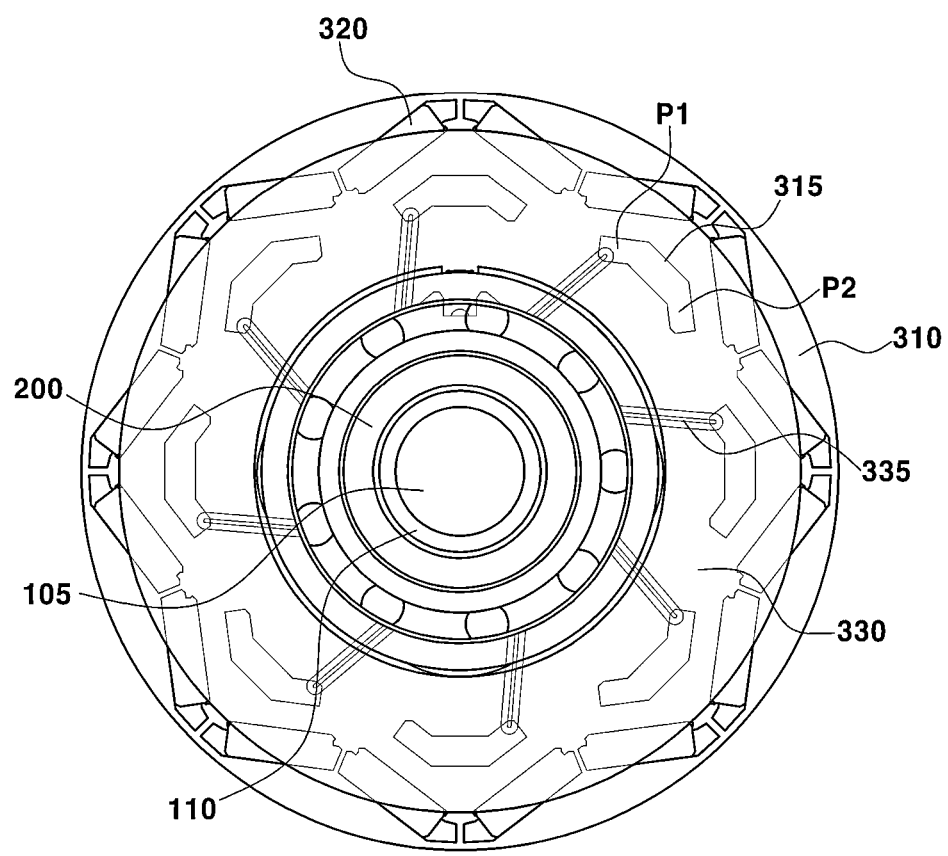
FIG. 3 is a cross-sectional view for explaining a fourth flow passage according to an embodiment of the present disclosure.

FIG. 3 is a cross-sectional view for explaining the fourth flow passage according to an embodiment of the present disclosure.

Referring to FIGS. 1-3, the third flow passage 335 may extend from a contact point between the rotor shaft 200 and the first plate 330 to the fourth flow passage 315. The fourth flow passage 315 may be formed in a space between the rotor shaft 200 and a pair of permanent magnets 320 constituting one of the poles of the rotor 300.

In one example, the third flow passage 335 may be formed in a region corresponding to one pole of the rotor 300.

As another example, a point at which the second flow passage 210 and the third flow passage 335 meet and a point at which the third flow passage 335 and the fourth flow passage 315 meet may be located in regions corresponding to opposite poles of the rotor 300. In other words, since the third flow passage 335 is inclined with respect to the direction from the center of the rotor shaft 200 toward the outer circumference of the rotor core 310, the starting point of the third flow passage 335 and the ending point of the third flow passage 335 may be located in regions corresponding to opposite poles of the rotor 300.

The point at which the third flow passage 335 and the fourth flow passage 315 meet is referred to as a first point P1. The point at which the fourth flow passage 315 and the plate hole (not shown) meet is referred to as a second point P2. The first point P1 and the second point P2 may be defined as predetermined points of the rotor core 310.

The fourth flow passage 315 may be formed to be curved toward the outer circumference of the rotor core 310. The fourth flow passage 315 may have a shape for enabling the oil introduced into the fourth flow passage 315 to be smoothly discharged into the plate hole (not shown). In other words, the oil introduced into the first point P1 of the fourth flow passage 315 may flow to the second point P2 of the fourth flow passage 315.

The third flow passage 335 and the fourth flow passage 315 may be formed in a plural number. At least one third flow passage 335 and at least one fourth flow passage 315 may be formed in each of the regions corresponding to the poles of the rotor 300.

Figure 4:
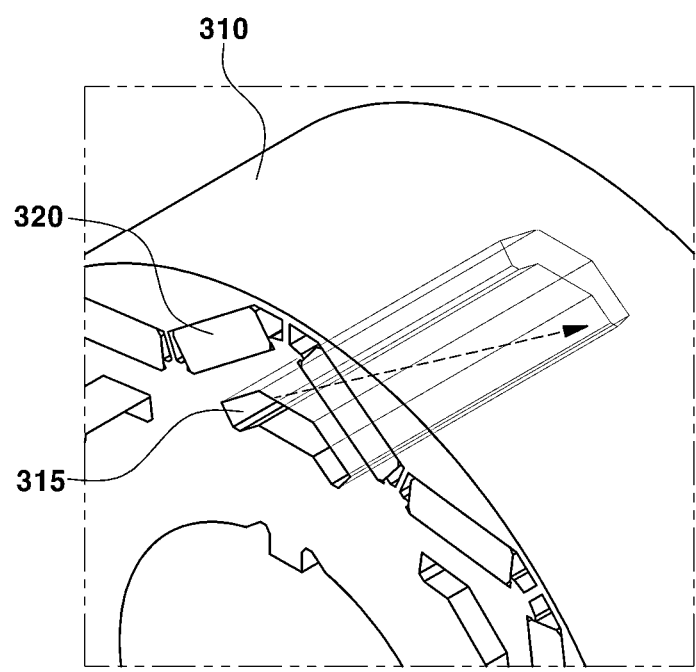
FIG. 4 is a view for explaining the moving path of oil in the fourth flow passage according to an embodiment of the present disclosure.
Figure 5:
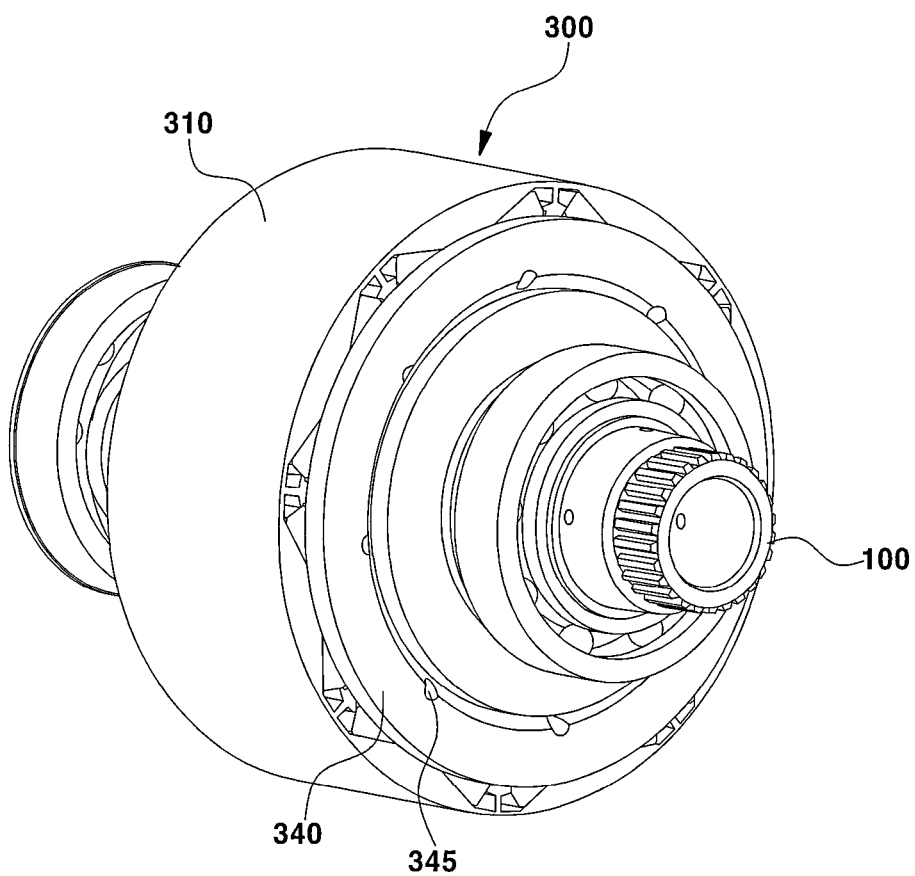
FIG. 5 is a perspective view for explaining a plate hole according to an embodiment of the present disclosure.

FIG. 4 is a view for explaining the moving path of oil in the fourth flow passage according to an embodiment of the present disclosure. FIG. 5 is a perspective view for explaining the plate hole according to an embodiment of the present disclosure.

Referring to FIGS. 1-5, the oil flowing through the fourth flow passage 315 may directly cool the rotor core 310. The fourth flow passage 315 may penetrate the rotor core 310 in the direction in which the core plates of the rotor core 310 are stacked. Oil may flow from the third flow passage 335 of the first plate 330 to the plate hole 345 formed in the second plate 340 and may be discharged from the inside of the rotor core 310 to the outside through the plate hole 345. Specifically, the oil introduced into the first point P1 of the fourth flow passage 315 may flow in a diagonal direction in the fourth flow passage 315 due to the rotational force of the rotor 300. Accordingly, the oil may be discharged through the plate hole 345 located at the second point P2 shown in FIG. 3. In other words, the third flow passage 335 may be connected to one end of the fourth flow passage 315 and the plate hole 345 may be connected to the other end of the fourth flow passage 315. If the plate hole 345 is connected to the one end of the fourth flow passage 315, the oil introduced into the fourth flow passage 315 may not be smoothly discharged. Therefore, in order to allow the oil introduced into the fourth flow passage 315 to be smoothly discharged, the plate hole 345 may be formed to be connected to the end of the fourth flow passage 315 that is located at a position opposite the rotating direction of the drive motor 1.

As is apparent from the above description, according to an embodiment of the present disclosure, it is possible to cool a rotor and a stator of a drive motor by forming flow passages in existing components without adding a separate component to the drive motor.

In addition, according to an embodiment of the present disclosure, since a flow passage that is inclined in a direction opposite the rotating direction of the rotor is formed in a plate of a rotor core, oil may smoothly flow through the flow passage when the drive motor rotates.

In addition, according to an embodiment of the present disclosure, it is possible to directly cool the rotor core by supplying oil to a flow passage formed to penetrate the rotor core.

While the embodiments of the present disclosure have been described with reference to the accompanying drawings, those having ordinary skill in the art should appreciate that the present disclosure may be implemented in other specific ways than those set forth herein without departing from the spirit and essential characteristics of the present disclosure. The above embodiments are therefore to be construed in all aspects as illustrative and not restrictive.

What is claimed is:

1. A rotor-cooling structure of a drive motor including an inner shaft, a rotor shaft surrounding the inner shaft, a rotor connected to the rotor shaft, and a stator disposed to be spaced apart from the rotor, the rotor-cooling structure comprising:
    a first flow passage formed in the inner shaft;
    a second flow passage formed in the rotor shaft to receive oil through the first flow passage;
    a third flow passage formed in a plate disposed at an end of a rotor core, constituting the rotor, to be connected to the second flow passage; and
    a fourth flow passage formed to be connected to the third flow passage and to penetrate the rotor core in a direction in which core plates constituting the rotor core are stacked,
    wherein the third flow passage extends in a direction from the rotor shaft toward an outer circumference of the rotor core,
    wherein an uppermost portion of the rotor core that is adjacent to the plate contacts the oil flowing through the third flow passage,
    wherein the third flow passage is inclined in a direction opposite a rotating direction of the rotor at a predetermined angle with respect to a direction from a center of the inner shaft toward the outer surface of the rotor core,
    wherein the third flow passage and the fourth flow passage are provided in a plurality thereof, and the number of fourth flow passages is the same as the number of third flow passages, and
    wherein the fourth flow passages are spaced apart from permanent magnets provided in the rotor.

2. The rotor-cooling structure of claim 1, wherein the first flow passage is formed in an axial direction of the inner shaft.

3. The rotor-cooling structure of claim 1, wherein the second flow passage is formed to penetrate the rotor shaft in a direction moving away from the inner shaft.

4. The rotor-cooling structure of claim 3, wherein the inner shaft has a discharge hole formed therein to discharge the oil, and
    wherein the discharge hole communicates with the second flow passage.

5. The rotor-cooling structure of claim 1, wherein the plate comprises a first plate, located at one end of the rotor core, and a second plate, located at an opposite end of the rotor core, and
    wherein the third flow passage is formed in the first plate.

6. The rotor cooling structure of claim 5, wherein the oil introduced into the third flow passage flows through the fourth flow passage and is discharged through a plate hole formed in the second plate.

7. The rotor-cooling structure of claim 6, wherein a point at which the third flow passage and the fourth flow passage meet corresponds to one end of the fourth flow passage, and a point at which the plate hole and the fourth flow passage meet corresponds to an opposite end of the fourth flow passage.

8. The rotor cooling structure of claim 7, wherein a first point at which the third flow passage and the fourth flow passage meet and a second point at which the fourth flow passage and the plate hole meet are offset based on the direction in which the rotor shaft extends.

9. The rotor-cooling structure of claim 1, wherein the fourth flow passage is formed in a space between the rotor shaft and a pair of the permanent magnets constituting one of poles of the rotor.

10. The rotor-cooling structure of claim 1, wherein the fourth flow passage is formed to be curved toward an outer circumference of the rotor core.

11. The rotor-cooling structure of claim 1, wherein at least one of the plurality of third flow passages and at least one of the plurality of fourth flow passages are formed in each of regions corresponding to poles of the rotor.

12. The rotor-cooling structure of claim 1, further comprising:
    a fifth flow passage formed in the rotor shaft to discharge the oil passing through the first flow passage,
    wherein the oil discharged from the fifth flow passage is moved toward the stator by rotation of the rotor.

13. The rotor-cooling structure of claim 1, further comprising:
    an oil pump provided in a housing accommodating the rotor and the stator to supply the oil to the inner shaft,
    wherein the oil supplied by the oil pump cools the rotor while flowing through the first flow passage, the second flow passage, the third flow passage, and the fourth flow passage.

* * * * *